United States Patent

Gary

(10) Patent No.: US 7,788,511 B2
(45) Date of Patent: Aug. 31, 2010

(54) METHOD FOR MEASURING UTILIZATION OF A POWER MANAGED CPU

(75) Inventor: Scott Paul Gary, Solvang, CA (US)

(73) Assignee: Texas Instruments Incorporated, Dallas, TX (US)

( * ) Notice: Subject to any disclaimer, the term of this patent is extended or adjusted under 35 U.S.C. 154(b) by 629 days.

(21) Appl. No.: 11/839,835

(22) Filed: Aug. 16, 2007

(65) Prior Publication Data

US 2009/0048804 A1    Feb. 19, 2009

(51) Int. Cl.
*G06F 1/26*    (2006.01)
(52) U.S. Cl. .................. 713/300; 713/320; 702/176; 710/260; 710/263; 712/233
(58) Field of Classification Search .............. 713/300; 702/176
See application file for complete search history.

(56) References Cited

U.S. PATENT DOCUMENTS 5,446,852 A  *   8/1995   Hilpert et al. ............... 713/300
2004/0252247 A1 * 12/2004   Wabiszczewicz ........... 348/734

* cited by examiner

*Primary Examiner*—Nitin C Patel
(74) *Attorney, Agent, or Firm*—Robert D. Marshall, Jr.; W. James Brady; Frederick J. Telecky, Jr.

(57) ABSTRACT

An extremely low overhead method calculates CPU load in the presence of both CPU idling and frequency scaling. The method measures time the CPU is idled while waiting for a wakeup. This invention uses a feature in current DSPs with the capability of delaying ISR processing on wake from IDLE. Using this mechanism it is possible to determine the time before IDLE, the time immediately following CPU wakeup, and then run the wakeup ISR. The delta time can be accumulated and compared to total time to determine true CPU load.

7 Claims, 3 Drawing Sheets

METHOD FOR MEASURING UTILIZATION OF A POWER MANAGED CPU

TECHNICAL FIELD OF THE INVENTION

The technical field of this invention is measuring power consumption of digital data processors.

BACKGROUND OF THE INVENTION

The percent load or utilization of a CPU is often measured so that CPU parameters can be tuned to match the required workload. For example, it is advantageous to reduce the CPU clock frequency if the CPU is lightly loaded to reduce heat and active power dissipation in the CPU. When increased performance is needed, the CPU frequency can be boosted. Such frequency boosting is called a turbo mode. The typical method for measuring the load of a deployed CPU tracks the number of times a calibrated idle loop runs. This number is used to calculate how much time the CPU is waiting for application threads. This is often referred to as the global CPU load.

Frequency scaling of the CPU is one technique used to save power. Another technique uses built-in idle and clock gating of a CPU during idle time to save power while the CPU has nothing to do and is waiting for an interrupt.

There is a conflict between the frequency scaling and clock gating techniques. Measuring load via the calibrated idle loop to determine when to scale the frequency requires the idle loop to run continuously (spinning). On the other hand, the CPU needs to be halted using the clock gating technique.

Spinning in the idle loop technique will not give accurate power monitoring when the CPU is idled. Conceptually it is possible to monitor all application threads, including hardware interrupts, software interrupts/signals and tasks and then infer that the remaining time is idle time. Implementing this is clearly complex for some thread architectures and could be accomplished only at a high overhead cost. Known attempts to implement this using thread hook functions have given highly inaccurate results with accuracies of ±20%. Performing this type of instrumentation/profiling can give valuable information on activity of individual threads and is clearly useful in a development environment but it is typically not useful in a fully deployed application environment. Further, the instrumentation of all threads will lead to increased power drain.

The term interrupt service routine (ISR) refers to the ordinary CPU processing executed when an interrupt triggers, preempting the normal processing of the CPU. This could be an interrupt from a serial port indicating that new data has arrived and needs to be transferred to memory immediately, otherwise such new incoming data will over-write the data currently buffered in the serial port.

SUMMARY OF THE INVENTION

This invention is an extremely low overhead method for calculating CPU load in the presence of both CPU idling and frequency scaling. The technique measures the time the CPU is idled while waiting for a wakeup. Current digital signal processors (DSPs) have a built-in but often neglected capability to delay ISR processing on wake up from IDLE. With this mechanism it is possible to use the time before IDLE and the time immediately following CPU wakeup and running the wakeup ISR. This invention accumulates the delta time and compares it to the total time to determine true CPU load.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
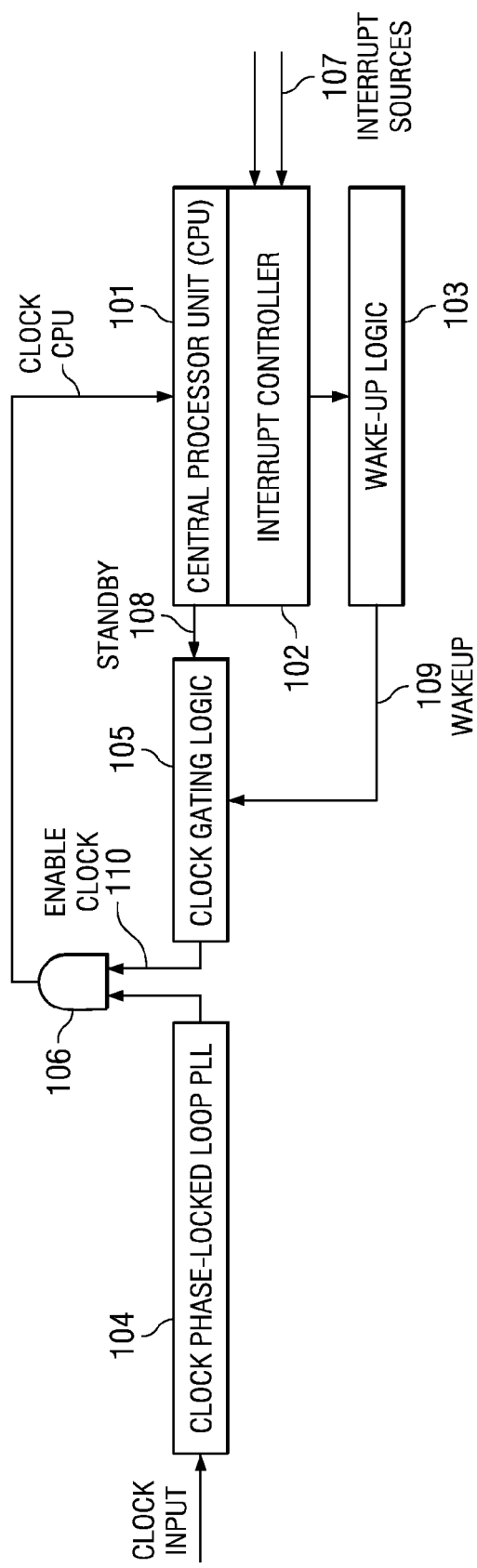
FIG. 1 is a block diagram of a typical processor with associated hardware to achieve synchronization with a phase-locked loop, but accommodating sleep mode and interrupt features (Prior Art)

This invention is an extremely low overhead method for calculating CPU load in the presence of both CPU idling and frequency scaling. This solution measures the time the CPU is idled while waiting for a wakeup. Normally this would be difficult process because an interrupt typically pulls the CPU directly out of IDLE state to run the interrupt service routine. Implementation of this idea would typically require the system software to instrument each interrupt service routine (ISR) or to require a central interrupt dispatcher to determine how long the CPU was halted.

There is nothing special about the ISRs used with this invention. The existing ISRs do not change. An existing hardware mechanism temporarily holds off branching to the ISR. Between invoking of the IDLE instruction and the actual CPU branch to the ISR, the CPU delays reading the time base. The difference between the previously sampled time (before IDLE) and the currently sampled time determines how long the CPU idled. The CPU adds this amount to a variable accumulating idle time. By comparing accumulated idle time to total time, it is possible to ascertain how long the CPU was idle and how long was doing real work. These two times enable calculation of the CPU load. This invention leverages the ability of some DSPs to indefinitely postpone the CPU processing of interrupt service routines (ISRs) upon CPU wakeup from the IDLE instruction. Normally, an ISR is enabled to execute if:

1. the CPU global interrupt enable bit is set; and
2. the particular interrupt is enabled (unmasked) via a corresponding bit in the CPU's interrupt enable register. Normally, both conditions must be met for response to an interrupt and service by its ISR.

The hold off mechanism is a special hardware feature that allows a slightly different behavior when a CPU invokes its IDLE instruction. When IDLE is invoked the CPU clock is typically gated OFF to save power while waiting for an interrupt. Such an interrupt indicates new work for the CPU to do. The only way to wake from IDLE is an interrupt. In this case, enabling the CPU global interrupt bit is not a condition on servicing the interrupt, but an indicator of how the CPU should resume processing.

If the global interrupt flag is set to enable before invoking IDLE, then when the interrupt occurs the CPU will wake up and immediately branch to the interrupt's service routine.

If the global interrupt flag is set to disable interrupt processing before invoking IDLE, then when the interrupt occurs the CPU will wake up and resume processing at the instruction immediately following IDLE. A CPU flag is set indicating that a specific wakeup interrupt is pending, but the servicing of the interrupt will be postponed until the global interrupt flag is set to enable interrupt processing. At that time the CPU will immediately branch to service the pending interrupt.

This invention places instructions to read the time (or CPU cycle count) immediately before executing the IDLE instruction and places instructions to measure the time (or CPU cycle count) immediately after the IDLE instruction. This invention determines how long the CPU was in IDLE (in units of time, or CPU cycles) while the ISR servicing is postponed. The CPU then re-enables global interrupt processing. This causes the wakeup ISR to run.

The application continues to do the work it needs to do, without modification. This invention merely inserts some instructions before and after the IDLE instruction. These inserted instructions monitor the CPU load with only a small latency added to interrupt processing and in a manner transparent to application execution.

FIG. 1 illustrates a block diagram of a typical processor with associated hardware to achieve synchronization with a phase-locked loop (PLL) accommodating sleep mode and interrupt features. CPU 101 receives a clock from PLL 104 via clock gating logic 105 and gate 106. Clock gating logic 105 is controlled by standby signal 108 from CPU 101 and wakeup signal 109 from interrupt controller 102. Interrupt controller 102 receives signals from one or more interrupt sources 107, which include both external and internal sources. Interrupt controller 102 performs routing and combining functions to direct CPU 101 to execute the appropriate interrupt service routine for the received interrupt signal.

A benefit of the present invention is that the existing ISR remains unchanged. The CPU uses a hardware mechanism to temporarily delay branching to the ISR. This invention reads the time base between invoking of the IDLE instruction and the actual CPU branch to the ISR. Subtracting the previously sampled time (before IDLE) from the current sampled time determines how long the CPU was idled. This invention adds this idle time amount to a variable that is accumulating idle time. This invention compares accumulated idle time to total time, determines how long the CPU has been idle and how long it has been doing real work (i.e. the CPU load).

Figure 2:
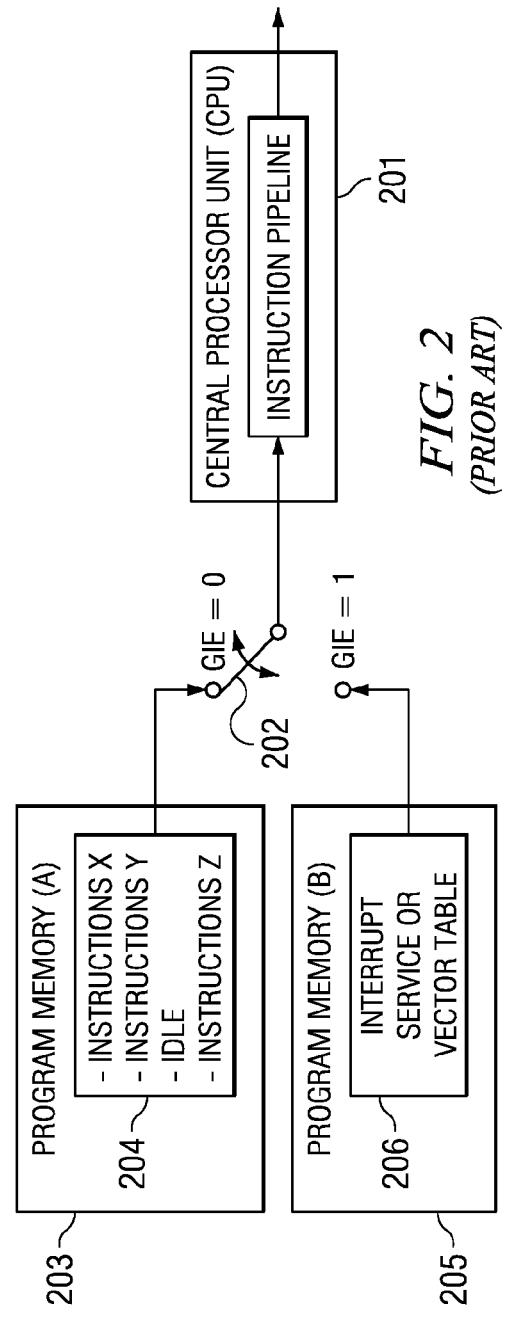
FIG. 2 illustrates the switch analogy of global interrupt enable (GIE) flag determining the program flow for wake-up from IDLE state (Prior Art)

FIG. 2 illustrates the switch analogy of Global Interrupt Enable (GIE) flag 202 in CPU system 201 determining program flow following wake-up from IDLE State. Consider when the GIE switch 202 is in upper position (GIE=0). The program memory 203 supplies all the commands 204 for normal processor execution. Once the IDLE instruction is executed clock gating logic 105 halts processing by disabling the CPU clock via clock enable signal 110 to gate 106. When a wakeup interrupt occurs, program memory A supplies instructions Z to the CPU for execution upon wakeup. When GIE 202 is enabled (set to 1) once again, program memory B 205 provides a vector to the ISR, or the actual instructions of the ISR, for execution by CPU 201.

Now consider a second scenario where the GIE switch 202 is in the lower position (GIE=1) when the IDLE instruction is executed from commands 204 in program memory 203. When a wakeup interrupt occurs, program memory B supplies a vector to the ISR, or the actual instructions of the ISR, for execution by CPU 201. When the ISR completes the return from interrupt instruction causes CPU 201 to return to the commands 204 following the IDLE instruction in program memory 203.

Some current DSPs have a built in capability to delay ISR processing upon wakeup from a clock-gated state. This overrides the normal interrupt service. Normally, an interrupt executes if:

1. the CPU global interrupt enable (GIE) bit 202 is set, and
2. the particular interrupt is enabled (unmasked) via a corresponding bit in the CPU interrupt enable register. Normally, both conditions must be met for an interrupt to be serviced by its ISR.

The override mechanism is a special feature that allows a slightly different behavior when the CPU invokes an IDLE instruction. When IDLE is invoked the CPU clock is typically gated OFF to save power while waiting for an interrupt that indicates there is new work for CPU 201. The only way to wake from IDLE is an interrupt. In this case enabling the CPU global interrupt bit 202 is not a condition on servicing the interrupt, but an indicator of CPU 201 should resume processing as follows:

If global interrupt flag 202 is set to enable before invoking IDLE, when an unmasked interrupt occurs CPU 201 will wake up and immediately branch to the interrupt service routine; and If global interrupt flag 202 is set to disable the interrupt processing before invoking IDLE, then when an unmasked interrupt occurs CPU 201 will wake up and resume processing at the instruction immediately following IDLE. A CPU flag is set indicating that the specific wakeup interrupt is pending, but the servicing of the interrupt is postponed until global interrupt flag 202 is set to enable interrupt processing by the code following the IDLE instruction. At that time CPU 201 will immediately branch to service the pending interrupt.

This invention places instructions to read the time (or CPU cycle count) immediately before executing the IDLE instruction and places instructions to measure the time (or CPU cycle count) immediately after the IDLE instruction. This invention determines how long the CPU was in IDLE (in units of time, or CPU cycles) while the ISR servicing is postponed. The CPU then re-enables global interrupt processing. This causes the wakeup ISR to run.

Figure 3:
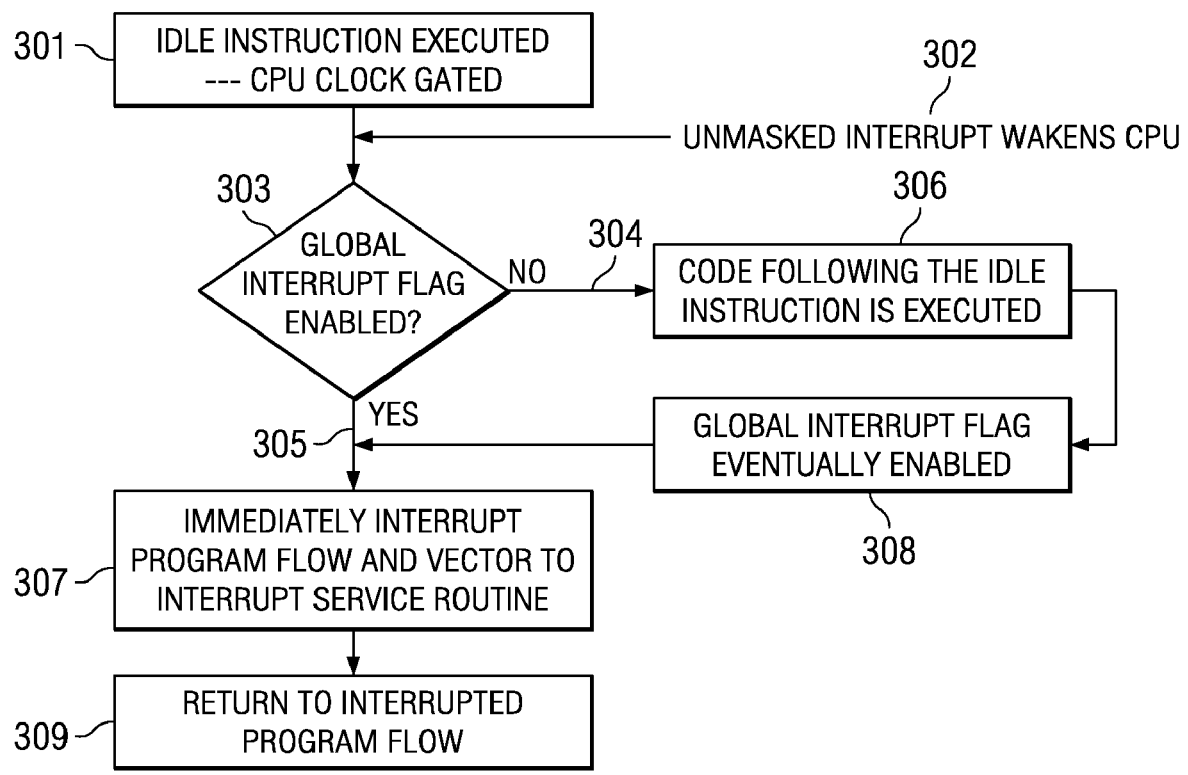
FIG. 3 is a flow chart of the effect of the global interrupt enable (GIE) flag on execution flow when waking from an IDLE Instruction (Prior Art)

FIG. 3 illustrates the effect of the global interrupt enable (GIE) flag 202 on execution flow when waking from an IDLE Instruction. Consider scenario where CPU 201 has just executed an IDLE instruction (block 301), which results in the CPU clock being gated off. If an unmasked interrupt 302 occurs wakening the CPU 201 then test 303 determines the state of GIE flag 202.

If test 303 determines GIE flag 202 is not enabled (NO at test 303), then program flow continues with the instruction immediately following the IDLE instruction (block 306). This path of code execution will continue until GIE flag 202 is enabled at block 308. Then the program flow is interrupted at block 307 for servicing of the pending ISR.

If test 303 determines GIE flag 202 is enabled (YES at test 303), then CPU 201 is immediately vectored to block 307 to the ISR for interrupt servicing. Once the ISR is completed in block 307, CPU 302 returns to the program flow interrupted by the ISR via block 309.

Thus the application continues to do the work it needs to do, but some code can be inserted that allows the possibility to monitor CPU load with only a small latency added to interrupt processing and in a manner transparent to application execution.

Figure 4:
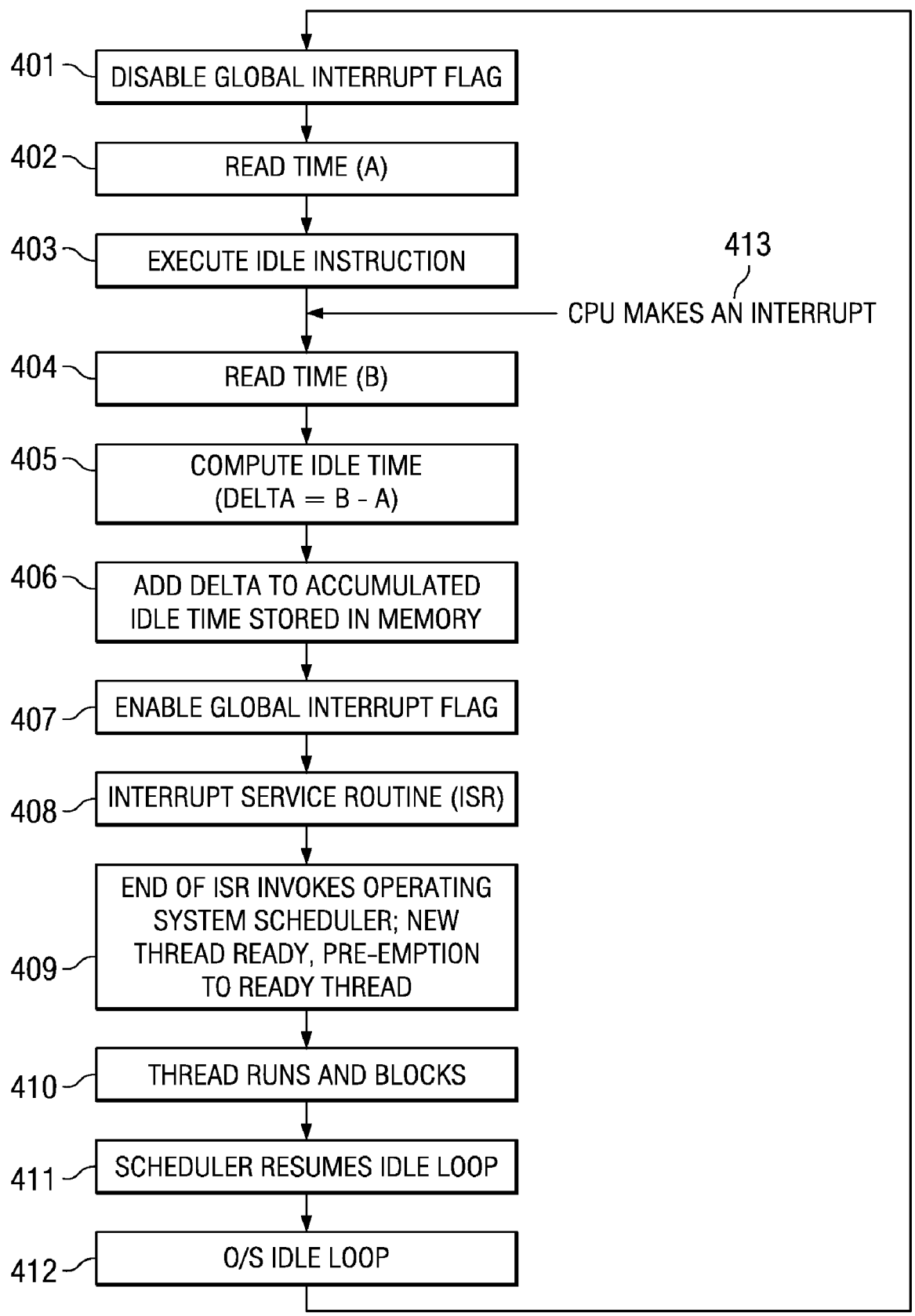
FIG. 4 is a flow chart showing the timing of IDLE instruction and wake-up pre-emption used according to this invention.

FIG. 4 illustrates the typical program flow of this invention showing timing of the operating system idle loop (or idle thread or task), and wake-up pre-emption for application work from the CPU IDLE instruction.

The flow for these operations commences with a disabling of GIE flag 202 in block 401.

The system timer is read (time A) in block 402.

The IDLE instruction follows in block 403.

CPU interrupt 413 causes CPU 201 to exit its idle state and resume normal processing.

The system timer is read (time B) in block 404.

CPU 202 computes the IDLE time (delta between time A and time B) in block 405.

In block 406 the computed IDLE time is accumulated and stored in memory.

In block 407 GIE 202 is re-enabled.

In block 408 the ISR is performed.

In block 409 the ISR is complete and the O/S scheduler causes a new processor thread to take control.

In block 410 the new thread is run. In block 411 the scheduler resumes the O/S IDLE loop 412 leading the process back to the starting point 401.

Time measurements in steps 402 and 404 may be performed in two possible ways: a time mode; or a cycle mode.

In the time mode the data is read from a traditional timer peripheral that is driven at a selected input clock rate. For example, a 1 MHz input clock would cause the timer's counting register to increment every microsecond. Typically the timer is configured to interrupt when a certain count threshold is reached, and then the CPU interprets this interrupt as a timer tick. For a threshold of 1000, the CPU sees a tick every millisecond. Thus for this invention a timer peripheral can be used as a reference for determining the duration spent in the IDLE instruction. The advantage is that these timers are very common and readily available. A disadvantage is if the timer rate is very slow compared to the CPU clock rate, the timer resolution will limit the accuracy of measurement. For example, for a very slow timer and a fast CPU, the CPU might read the timer, go IDLE, wake up from a quick interrupt, and read the timer again, before the timer increments. So it would seem there was no time spent in IDLE.

In the cycles mode a CPU-local cycle counter is used. For example, some CPUs have a 64-bit time stamp counter that simply increments on each CPU cycle. This counter runs at the same rate as the CPU, so the number of cycles spent in IDLE is easily determined. This time stamp counter also has the advantage that it is local and can be read with only one cycle of latency as opposed to reading an external timer peripheral that might require many cycles to read across the CPU bus/interconnect. Since CPU load is determined by a ratio of idle versus work, the timing process can use either a time reference or a cycle reference, and the units of measurement cancel out.

The present invention has the following advantages. This invention is simple and easy to implement. This invention has low overhead because it requires only a short routine to be spliced into the OS idle loop, plus a free running counter. This invention does not collide with CPU idling, but instead it leverages CPU idling to both save power and measure CPU load. This invention works in the presence of frequency scaling of both CPU and counter. This invention does not require idle loop calibration and is therefore not susceptible to variable execution paths causing inaccurate results. This invention is most accurate by virtue of including all applications, interrupts, operating systems operations and chip context switch overhead as CPU load.

An example formula for fractional (percent/100) CPU load is as follows:

$$CPU\ Load = \left(\frac{Accumulated\ IDLE\ Time\ or\ Cycles}{Total\ Time\ or\ Cycles\ for\ Interval}\right)$$

What is claimed is:

1. A method for computation of data processor utilization comprising the steps of:
   accumulating total data processor execution time;
   accumulating data processor idle time in a power reduced state; and
   initially upon an interrupt of the data processor from the power reduced state performing the steps of:
      deferring interrupt service from the power reduced state to read total data processing execution time,
      reading data processor idle time;
      accumulating data processor utilization;
      totaling execution time and CPU idle time; and
   thereafter upon any subsequent interrupt of the data processor from the power reduced state proceeding directly to service the interrupt.

2. The method of claim 1, wherein:
   said step of accumulating total data processor execution time employs a hardware timer; and
   said step of accumulating data processor idle time includes:
      reading the hardware timer upon entry into the power reduced state,
      reading the hardware timer upon exit from the power reduced state, and
      calculating a data processor idle time as a difference between the time upon exit from the power reduced state and the time upon entry into the power reduced state.

3. The method of claim 2, wherein:
   said step of calculating data processor utilization includes calculating 1 minus a ratio of data processor idle time to total data processor execution time.

4. The method of claim 1, wherein:
   said step of accumulating total data processor execution time employs a data processor cycle counter; and
   said step of accumulating data processor idle time includes:
      reading the data processor cycle counter upon entry into the power reduced state,
      reading the data processor cycle counter upon exit from the power reduced state, and
      calculating a data processor idle count as a difference to the count upon exit from the power reduced state and the count upon entry into the power reduced state.

5. The method of claim 4, wherein:
   said step of calculating data processor utilization includes calculating 1 minus a ratio of data processor idle count to total data processor execution count.

6. The method of claim 1, wherein:
   said step of deferring interrupt from the power disabled state includes:
      setting a global interrupt enable bit to disable,
      upon receiving an interrupt if the global interrupt bit indicates enable, performing an interrupt service routine corresponding to the interrupt, and
      upon receiving an interrupt if the global interrupt bit indicates disable, performing instructions next following an IDLE instruction causing the data processor to enter the power reduced state.

7. The method of claim 1, wherein:

said step of deferring interrupt from the power disabled state includes:

inserting code into each interrupt service which checks if the data processor was in a power reduced state, performing the interrupt service routine if the data processor was not in a power reduced state, and branching to a deferred interrupt routine and thereafter performing the interrupt service routine if the data processor was in a power reduced state.

* * * * *